United States Patent [19]

Imataki et al.

[11] Patent Number: 4,871,649
[45] Date of Patent: Oct. 3, 1989

[54] OPTICAL RECORDING MEDIUM AND OPTICAL RECORDING METHOD USING THE SAME

[75] Inventors: Hiroyuki Imataki, Kawasaki; Mizuho Hiraoka, Isehara; Sachiko Ichikawa; Yoshihiro Ogawa, both of Sagamihara; Hitoshi Yoshino, Atsugi, all of Japan

[73] Assignee: Canon Kabushiki Kaisha, Tokyo, Japan

[21] Appl. No.: 28,129

[22] Filed: Mar. 19, 1987

[30] Foreign Application Priority Data

Mar. 20, 1986 [JP] Japan ................... 61-60613

[51] Int. Cl.⁴ .............................. G03C 1/72
[52] U.S. Cl. ................... 430/270; 430/495; 430/945; 430/964; 346/135.1
[58] Field of Search ............ 430/945, 495, 273, 275, 430/276, 346, 270, 964; 346/135.1, 137; 369/273, 275, 277, 283, 284

[56] References Cited

U.S. PATENT DOCUMENTS

| 4,176,277 | 11/1979 | Bricot et al. | 430/273 |
| 4,296,158 | 10/1981 | Lewis | 428/65 |
| 4,363,844 | 12/1982 | Lewis et al. | 428/65 |
| 4,408,319 | 10/1983 | Tsunoda et al. | 369/284 |
| 4,629,668 | 12/1986 | Hamersley et al. | 430/14 |
| 4,652,498 | 3/1987 | Wolf et al. | 369/284 |
| 4,670,332 | 6/1987 | Werner et al. | 430/945 |

FOREIGN PATENT DOCUMENTS 74834 5/1982 Japan .................... 430/945

*Primary Examiner*—Paul R. Michl
*Assistant Examiner*—Lee C. Wright
*Attorney, Agent, or Firm*—Fitzpatrick, Cella, Harper & Scinto

[57] ABSTRACT

An optical recording medium wherein recording information has been recorded as pits, comprises an absorptive layer and a reflective layer placed thereon, the absorptive layer having, on the surface, concave portions thermally deformed by heat generated upon irradiation of light beams, and the reflective layer having concave pits formed by deformation as a consequence of the thermal deformation of the absorptive layer and covering said concave portions of the absorptive layer in such a state that the concave portions are not exposed.

An optical recording method comprises irradiating an optical recording medium having an absorptive layer and a reflective layer placed thereon, with light beams to generate a heat, allowing the heat to cause the thermal deformation of the absortive layer to form concave portions on the surface of the absorptive layer, deforming the reflective layer as a consequence of the thermal deformation of the absorptive layer, thereby allowing the deformed reflective layer to cover the concave portions of the absorptive layer in such a state that the concave portions are not exposed and to form concave pits.

6 Claims, 1 Drawing Sheet

OPTICAL RECORDING MEDIUM AND OPTICAL RECORDING METHOD USING THE SAME

BACKGROUND OF THE INVENTION

1. Field of the Invention

The present invention relates to an optical recording medium and an optical recording method using said medium. More particularly, the present invention relates to an optical recording medium for use as a portable information recording media which allows optical recording and reading of information, such as optical disk, cash card, credit card and ID card, as well as to an optical recording method using said medium.

2. Related Background Art

The conventionally known methods for recording information on an optical recording medium is by applying laser beams thereto to alter its condition are largely divided into the following two methods.

The first method is one utilizing a phenomenon that an optical recording medium, when irradiated with laser beams of $TiO_2$, chalcogenide glass or the like, generates heat and thereby causes a phase change between an amorphous state and a crystalline state.

However, this method is defective in that the amorphous nature of the optical recording medium used is gradually lost due to its spontaneous crystallization, tending to regenerate wrong information.

The second method is one disclosed in, for example, Japanese Patent Application laid-Open No. 17139/1982, which comprises applying laser beams to a recording layer consisting of an absorptive layer composed of an organic dye (e.g. squalene, naphthoquinone) and a reflective layer placed thereon and composed of a low-melting metal (e.g. Bi, Te), to cause the deformation of the recording layer, removing the deformed portions to form pits, and recording information in these pits.

In this method, reading of recorded information is conducted by detecting the change of reflectivity or transmittance. However, the method is defective in that excessive or insufficient deformation takes place in formation of pits making their shape unstable. Further the types of raw materials usable for the recording layer are restricted.

Optical recording methods wherein no pit is formed have been proposed recently.

For example, Japanese Patent Application Laid-Open No. 127937/1981 discloses a method which comprises applying laser beams to an optical recording medium consisting of a substrate, an intermediate layer placed thereon and composed of an organic material and a metal layer placed on the intermediate layer to heat the intermediate layer, allowing the intermediate layer to absorb the heat and thereby to cause swelling and to form protuberances, and recording information in these protuberances.

However, this method is defective in various respects. That is, the optical recording media has poor durability because the protuberances which are formed on the substrate and wherein information is recorded tend to deform due to external pressures; the metal layer must be thick in order to prevent the leakage of the gas generated by foaming to form protuberances and accordingly a large energy is required to enable recording of information; moreover, the protuberances wherein recording is made tend to have an unstable shape.

SUMMARY OF THE INVENTION

A object of the present invention is to provide an optical recording medium free from the above mentioned drawbacks of the prior art and an optical recording method using said medium.

Another object of the present invention is to provide an optical recording medium which has a stable pit shape, has a high S/N ratio during reading, causes no scattering during recording, causes no reduction in S/N ratio, requires a small energy for recording and enables the use of a broad range of raw materials, as well as to an optical recording method using said medium.

According to one aspect of the present invention there is provided an optical recording medium wherein recording information has been recorded as pits, which comprises an absorptive layer and a reflective layer placed thereon, the absorptive layer having, on the surface, concave portions thermally deformed by heat generated upon irradiation of light beams, and the reflective layer having concave pits formed by deformation as a consequence of the thermal deformation of the absorptive layer and covering said concave portion of the absorptive layer in such a state that the concave portions are not exposed.

According to another aspect of the present invention, there is provided an optical recording medium which comprises irradiating an optical recording medium having an absorptive layer and a reflective layer placed thereon, with light beams to generate a heat, allowing the heat to cause the thermal deformation of the absorptive layer to form concave portions on the surface of the absorptive layer, deforming the reflective layer as a consequence of the thermal deformation of the absorptive layer, thereby allowing the deformed reflective layer to cover the concave portions of the absorptive layer in such a state that the concave portions are not exposed and to form concave pits.

DETAILED DESCRIPTION OF THE PREFERRED EMBODIMENTS

The present invention relates to an optical recording medium wherein recording information has been recorded as pits, which comprises an absorptive layer and a reflective layer placed thereon, the absorptive layer having, on the surface, concave portions thermally deformed by heat generated upon irradiation of light beams, and the reflective layer having concave pits formed by deformation following the thermal deformation of the absorptive layer and covering said concave portions of the absorptive layer in such a state that the concave portions are not exposed, as well as to an optical recording method which comprises irradiating an optical recording medium having an absorptive layer and a reflective layer placed thereon, with light beams to generate a heat, allowing the heat to cause the thermal deformation of the absorptive layer to form concave portions on the surface of the absorptive layer, deforming the reflective layer as a consequence of said thermal deformation of the absorptive layer, thereby allowing the deformed reflective layer to cover the concave portions of the absorptive layer in such a state that the concave portions are not exposed and to form concave pits.

Figure 1:
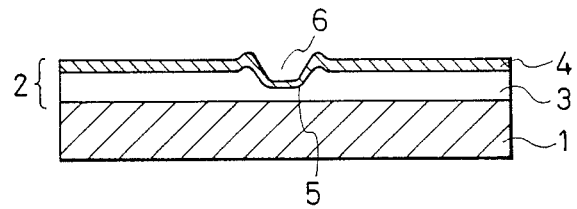
FIG. 1 is a sectional view showing a typical constitution of the optical recording medium of the present invention.

The present invention will be explained in detail below. FIG. 1 is a sectional view of a typical constitution of the optical recording medium of the present invention. The optical recording medium of FIG. 1. according to the present invention consists of a substrate 1, an absorptive layer 3 placed thereon and a reflective layer 4 placed on the absorptive layer 3, wherein the absorptive layer 3 and the reflective layer 4 together form an optical recording layer 2. The absorptive layer 3 has, on the surface, concave portions 5 formed by (a) irradiation of light beams, (b) resultant heat generation and (c) subsequent thermal deformation. The reflective layer 4 has concave pits 6 formed by (a) deformation following the thermal deformation of the absorptive layer 3 and (b) resultant covering of said concave portions 5 by the deformed reflective layer in such a state that the concave portions 5 are not exposed.

Figure 2:
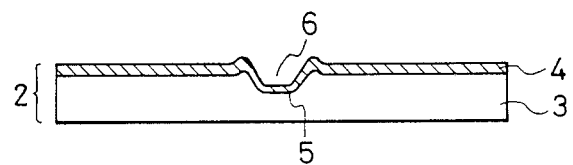
FIGS. 2 and 3 are each a sectional view showing other constitution of the optical recording medium of the present invention.

FIG. 2 is a sectional view showing other constitution of the optical recording medium of the present invention. The optical recording medium of FIG. 2 consists of an absorptive layer 5 having concave portions 5 formed by thermal deformation and a reflective layer 4 placed thereon and having concave pits 6. The absorptive layer 3 contains such materials as the layer 3 can function also as a substrate.

One feature of the optical recording medium of the present invention is that the recording layer has concave pits formed by coverage of the upper surface of the concave portions formed by the thermal deformation of the absorptive layer, with the reflective layer deformed as a consequence of said thermal deformation of the absorptive layer.

In the present invention, the substrate 1 can be made from, for example, a glass plate, a ceramic plate, a metal plate or sheet of aluminum, stainless steel or the like, or a plastic plate of polycarbonate, polyvinyl chloride, polymethyl methacrylate (PMMA) or the like. The substrate has no particular restriction as to its transparency and size as long as it satisfies requirements for substrate of optical recording media.

In the present invention, the recording layer 2 consists of the reflective layer 4 and the absorptive layer 3.

The recording layer should be composed of so-called heat mode recording materials which can conduct (a) light absorption upon irradiation of light beams, (b) conversion of the absorbed light to a heat and (c) formation of concave pits by the heat. In addition, the recording layer must have reflectability for enabling reading of recorded information.

In view of the above requirements, in the optical recording medium of the present invention, the reflective layer 4 and the absorptive layer 3 are laminated to form a recording layer, as seen in FIG. 1. This is a characteristic of the present invention.

In the present invention, the reflective layer is an important element for specifying the S/N of recording information and must have a large ratio of reflection intensity after recording to reflection intensity before recording.

The reflected signals from the reflective layer operate At, AF which is important for recording or regeneration of optical recording medium.

In view of the above matters, the reflective layer is preferred to have a reflectivity as large as possible. Meanwhile, the reflective layer is required to have appropriate light absorbability for information recording. Therefore, the reflective layer must have an appropriate balance of reflectivity and absorbability.

It is adequate that the reflective layer has a reflectivity of 10 to 85%, preferably 20 to 60% when measured using wavelengths of recording and reading lights, particularly of a reading light.

The above reflectivity is not necessarily required when light beams are applied from the side of the absorptive layer to conduct recording.

The reflective layer is constituted by a vapor deposition film of a metal such as gold, silver, copper, tin, aluminum, nickel, chromium or the like, an electroless plating of said metal formed by chemical plating, physical phenomenon or the like, or a coating film which is a dispersion of particles of said metal in a vehicle. Of these, the vapor deposition film is particularly preferred.

The thickness of the reflective layer is determined by (a) its reflectivity partly dependent upon the absorptive layer and (b) the constitution of the reflective layer, namely, a vapor deposition film, an electroless plating or a coating film. The desirable range of the thickness is several tens of angstroms to several millimeters, preferably 20 Å to 1.0 mm.

Also, an organic thin film capable of being optically changed in the physical properties by an energy beam can be used although it is not as reflective as a metal, and the organic thin film can be formed continuously by use of a solution or dispersion system material. Therefore, it is preferable for mass production. The material constituting the organic thin film may include, for example, anthraquinone derivatives (particularly, those having an indanthrene skeleton), dioxazine compounds and derivatives thereof, triphenodithiazine compounds, phenanthrene derivatives, cyanine compounds, merocyyanine compounds, pyrylium type compounds, xanthene type compounds, triphenylmethane type compound, croconium type compounds, azo dyes, crocones, azines, indigoids, methine type dyes, azulenes, squarium derivatives, sulfur dyes, dithiolate complex of metal, and the like.

Such an organic thin film of a dye can be formed by the known coating method, including, for example, dip-coating, spray coating, spinner coating, bar coating, blade coating, roll coating, curtain coating, and the like.

In the present invention, the absorptive layer has two functions, namely, a function of absorbing a light energy applied during recording and converting it to a heat energy and a function of causing thermal deformation by the heat energy to form concave portions and finally forming concave pits together with the reflective layer.

The absorptive layer is constituted by a light-absorbing substance such as a dye, a pigment or the like, having absorbability for the wavelength of light beams used for optical recording, or by a dispersion of such a light-absorbing substance in a binder.

As the light-absorbing substance, for example, the following substances can be used preferably.

(1) Low-melting metals such as Te, Bi, Sn, Sb, In and the like, as well as particles of metals such as Au, Ag, Cu and the like.

(2) Dyes and pigments of cyanine type, squarium type, phthalocyanine type, tetradehydrocholine type, methine type, naphthoquinone type, polymethine type, etc.

(3) Organometal complexes such as benzenedithiol nickel complex and the like.

(4) Black dyes and pigments such as Nigrosine, carbon black and the like.

(5) Inorganic compounds such as black toner used in copiers, magnetite (FeO) and the like.

As the vehicle or binder used for dissolving or dispersing the light-absorbing substance, there can be mentioned organic high molecular substances such as various resins [vinyl resins (e.g. polyvinyl chloride, polyvinyl alcohol, polyvinyl acetate), olefinic resins (e.g. polyethylene, polypropylene), acrylic resins (e.g. polymethyl methacrylate, polymethyl acrylate), polyester resins, polyamide resins, polystyrene resins, cellulose resins, polycarbonate resins, ionomer resins, etc.] and their copolymers and mixtures; organic carboxylic acids such as stearic acid, palmitic acid, phthalic acid, succinic acid and the like; solid paraffin; and so forth.

It is desirable that these substances can cause thermal deformation such as melting, thermal softening or the like at temperatures up to 300° C., preferably up to 200° C.

The thickness of the absorptive layer is desired to be several tens of angstroms to several millimeters, preferably 700 Å to 1.8 mm.

In the present invention, when the recording layer 2 is provided on the substrate 1, it can be done by forming, on the substrate 1, an absorptive layer 3 and a reflective layer 4 in this order by coating or by using an adhesive such as a dry laminating agent or the like.

When the recording layer is formed by coating, for example, a silver salt emulsion on a thin film or the like, the recording layer plus the film can be provided on a substrate via an adhesive.

Figure 3:
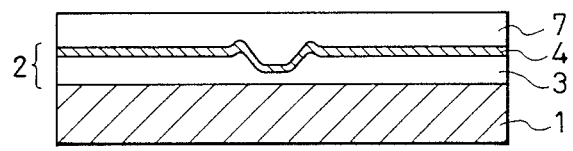

The optical recording medium of the present invention can have a protective layer 7 on the recording layer, as seen in FIG. 3. The protective layer 7 imparts to the recording layer 2, mechanical, chemical and physical environmental resisting properties and covers the recording layer 2 with a material through which both a recording light and a reading light can transmit.

As the protective layer 7, there can be mentioned, for example, a glass plate, a ceramic plate, and a plastic plate (e.g. polymethyl methacrylate, polycarbonate, polyvinyl chloride, polyethylene terephthalate, polystyrene, CR-39, polymethylpentene) Such a sheet is provided on the recording layer via, as necessary, an adhesive layer.

Alternatively, such a plastic material is directly coated on the recording layer and then set to obtain a protective layer. In this case, the use of a radiation-setting resin is possible.

In providing the protective layer on the recording layer, they need not be in tight contact with each other and can be provided apart via air or an inert gas by using a spacer.

To the outer surface of the protective layer can be applied treatments for wear prevention, hardening, staining prevention and charging prevention in order to present adhesion of flaws and pick-up of dust during handling, as well as treatments for improvements of moisture resistance, ultraviolet resistance and oxygen permeation resistance (i.e. $O_2$ gas barrier treatment) in order to improve the durability of optical recording medium.

Next, the optical recording method of the present invention will be explained referring to the drawings.

Figure 4:
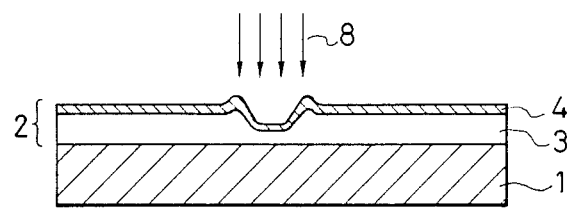
FIG. 4 illustrates a typical example of the optical recording method of the present invention.

In FIG. 4, when a recording layer 2 consisting of an absorptive layer 3 and a reflective layer 4 is irradiated with condensed light beams 8, the beams which have transmitted through the reflective layer 4 in accordance with the transmittance of reflective layer 4 reach the absorptive layer 3, are converted to a heat. This heat allows the absorptive layer 3 to thermally deform and to form concave portions 5. The portions of the reflective layer 4 above the concave portions 5 are deformed as a consequence of said thermal deformation of the absorptive layer 3 to form concave pits 6. In this case, the deformation of the reflective layer 4 takes place in such a state that the absorptive layer 3 beneath the reflective layer 4 is not exposed.

The deformation of the reflective layer can be examined by applying a reading light, i.e., condensed light beams and detecting the difference in reflectivity between concave pits and undeformed portions.

In the optical recording method of the present invention, the thermal deformation of the absorptive layer 3 takes place first and, as its consequence, the reflective layer 4 is deformed. At this time, unlike the case of conventional pits where breakage occurs, it is required that the concave pits of the reflective layer 4 be not broken and the absorptive layer 3 beneath the reflective layer 4 be not exposed.

Hence, the concave pits 6 formed by the recording layer 2 are covered by the deformed portions of the reflective layer 4 which have been formed on the concave portions of the absorptive layer 3 as a consequence of the formation of these concave portions. The portions of the reflective layer 4 covering the concave pits are not in a broken state but are in a continuous state without any holes. According to the microscopic observation of the reflective layer 4, the surface can have, in some cases, fine wrinkles or cracks due to the expansion and contraction caused by the deformation; however, the reflective layer 4 retains a layer structure and, as a whole, forms a gentle undulation and covers the concave portions of the absorptive layer 3 in such a state that the absorptive layer is not exposed.

The light beams used for recording or reading in the optical recording method of the present invention can be, for example, gas (e.g. Ar, Xe, $Co_2$) laser beams, solid laser beams or semiconductor laser beams. The intensity of light beams applied differs by the type of recording layer but is preferred to be ordinarily 1 to 10 mW.

The recording and reading apparatus has no particular restriction and can be one ordinarily used, such as CD, LD or the like.

The present invention will be explained in more detail below by way of Examples.

EXAMPLE 1

Gold was vapor-deposited on a black (polyethylene terephthalate) substrate [Ruminer (trade name) manufactured by TORAY K. K.] having a thickness of 0.25 mm, to a thickness of 50 Å at a rate of 1 Å/sec under a pressure of $1.0 \times 10^{-5}$ Torr. The resulting sample had a light reflectivity of 55% for a light having a wavelength of 830 nm.

Recording was conducted on the sample by condensing semiconductor laser beams (wave length of 830 nm) of 5 mW to spots of 5 μm in diameter and applying the condensed beams to the sample for 100 μsec and then reading was conducted using the same laser beams at an output of 0.1 mW, whereby a contrast of 0.79 was obtained. Subsequently, the sample was subjected to an accelerated deterioration test for 1,000 hours under the conditions of 45° C. and 95% RH, wherein no change in light reflectivity and pit shape was seen.

EXAMPLE 2

Copper was vapor-deposited on the same substrate as used in Example 1, to a thickness of 50 Å under the same conditions as used in Example 1. The resulting sample had a light reflectivity of 20%. Recording and reading were conducted in the same manner as in Example 1, whereby a contrast of 0.95 was obtained.

EXAMPLE 3

Aluminum was vapor-deposited on the same substrate as used in Example 1, to a thickness of 50 Å under the same conditions as used in Example 1. The resulting sample had light reflectivity of 30%. Recording and reading were conducted in the same manner as in Example 1, whereby a contrast of 0.73 was obtained.

COMPARATIVE EXAMPLE 1

Nitrocellulose was centrifugally deposited on a polymethyl methacrylate having a thickness of 1.5 mm, to a thickness of 5,000 Å. Thereon was further vacuum-deposited Cr-Au (Cr:Au=20:80 by weight) to a thickness of 80 Å at a rate of 3 Å/sec.

The resulting sample was subjected to recording, and reading characteristic measurement in the same manners as in Example 1. The laser power necessary for conducting recording was 10 mW in this Comparative Example 1 while in Example 1, recording was possible with a laser power of 2 mW.

With respect to the waveform of read signal, the waveform was nonuniform in Comparative Example 1 while that of Example 1 was uniform.

Recording pits were observed after magnification of 300 times. Nonuniform recording pits were formed in Comparative Example 1 while in Example 1, uniform pits were formed.

COMPARATIVE EXAMPLE 2

The same sample as in Example 1 was irradiated with a semi-conductor laser beam of 20 mW. As a result, the recording could be effected, but the read waveform was not uniform. When the recorded pits were observed at the magnification of 300 times, the absorptive layer was exposed from the bottom of the reflective layer in the concave form, and the forms of the concave pits were not uniform.

EXAMPLE 4

Carbon black (RAVEN 1255 manufactured by Columbia Carbon co.) was coated on a polymethyl methacrylate of 0.5 mm thickness by use of a polyvinylbutyral as the binder. Gold was further vapor-deposited thereon in the same manner as in Example 1. The resulting sample was subjected to the recording and reading similarly to Example 1, a contrast of 0.70 was obtained at a laser power of 5 mW.

EXAMPLE 5

A dichloroethane solution (concentration: 2 wt. %) of the dye represented by the following formula [1] was spinner-coated to a thickness of about 900 Å on the same substrate as in Example 1.

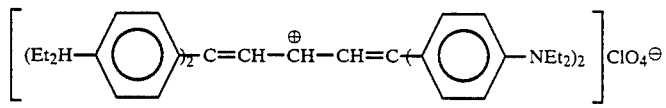

With the resulting sample, the recording and reading were conducted in the same manner as in Example 1, a contrast of 0.60 was obtained at a laser power of 3 mW.

The optical recording medium and optical recording method of the present invention have the following meritorious effects.

As stated above, the optical recording medium of the present invention, forming unbroken and stable concave pits as a result of the thermal deformation of the absorptive layer and the reflective layer, can give a very small error in reading and a high S/N ratio.

In the optical recording method using the optical recording medium of the present invention, a hole is not made as opposed to the case of conventional pit formation; no scattering of any amount of the optical recording medium occurs; consequently, reduction in S/N can be prevented.

Since the reflective layer can be relatively thin, recording can be conducted with a small energy. A wide range of raw materials can be used for the optical recording medium of the present invention.

What is claimed is:

1. An optical recording method which comprises irradiating an optical recording medium having an absorptive layer and a reflective layer placed thereon, with light beams to generate heat, allowing the heat to cause the thermal deformation of the absorptive layer to form concave portions on the surface of the absorptive layer, deforming the reflective layer as a consequence of the thermally deformed concave portions of the absorptive layer, thereby allowing the deformed reflective layer to cover the concave portions of the absorptive layer such that the concave portions of the absorptive layer are not exposed and to form concave pits corresponding to the concave portions of the absorptive layer.

2. An optical recording method according to claim 1, wherein the reflective layer is a film formed by vapor deposition.

3. An optical recording method according to claim 1, wherein the reflective layer has a reflectivity of 10 to 185%.

4. An optical recording method according to claim 3, wherein the reflective layer has a reflectivity of 20 to 60%.

5. An optical recording method according to claim 1, wherein the absorptive layer contains a light absorbing substance selected from the group consisting of a dye or a pigment.

6. An optical recording method according to claim 1, wherein the light beams are semiconductor laser beams.

* * * * *

UNITED STATES PATENT AND TRADEMARK OFFICE
CERTIFICATE OF CORRECTION

PATENT NO. : 4,871,649

DATED : October 3, 1989

INVENTOR(S) : HIROYUKI IMATAKI, ET AL.

Page 1 of 2

It is certified that error appears in the above-identified patent and that said Letters Patent is hereby corrected as shown below:

COLUMN 1

Line 11, "media" should read --medium--.
Line 17, "is" should be deleted.
Line 31, "laid-" should read --Laid- --.
Line 43, "Further" should read --Further,--.

COLUMN 2

Line 4, "above men-" should read --above-men- --.
Line 14, "invention" should read --invention,--.

COLUMN 3

Line 27, "absorptive layer 5" should read --absorptive layer 3--.

COLUMN 4

Line 40, "merocyyanine" should read --merocyanine--.

COLUMN 5

Line 48, "polymethylpentene)" should read --polymethylpentene).--.
Line 63, "present" should read --prevent--.

UNITED STATES PATENT AND TRADEMARK OFFICE
CERTIFICATE OF CORRECTION

PATENT NO. : 4,871,649
DATED : October 3, 1989
INVENTOR(S) : HIROYUKI IMATAKI, ET AL.

Page 2 of 2

It is certified that error appears in the above-identified patent and that said Letters Patent is hereby corrected as shown below:

COLUMN 8

Line 12, "($Et_2H$" should read --($Et_2N$--.
    Line 56, "185%." should read --85%.--.

Signed and Sealed this

Thirtieth Day of October, 1990

Attest:

HARRY F. MANBECK, JR.

*Attesting Officer*     *Commissioner of Patents and Trademarks*